(12) United States Patent
Leitner

(10) Patent No.: US 7,984,624 B2
(45) Date of Patent: Jul. 26, 2011

(54) ICED AIR COOLER

(76) Inventor: Dan Leitner, Walnut Creek, CA (US)

( * ) Notice: Subject to any disclaimer, the term of this patent is extended or adjusted under 35 U.S.C. 154(b) by 378 days.

(21) Appl. No.: 12/012,573

(22) Filed: Feb. 4, 2008

(65) Prior Publication Data

US 2008/0184725 A1  Aug. 7, 2008

Related U.S. Application Data

(60) Provisional application No. 60/899,359, filed on Feb. 5, 2007.

(51) Int. Cl.
*F25D 3/02* (2006.01)

(52) U.S. Cl. ............................. 62/420; 62/312

(58) Field of Classification Search .................. 62/420, 62/337, 312, 423, 424, 425
See application file for complete search history.

(56) References Cited

U.S. PATENT DOCUMENTS

| | | | | |
|---|---|---|---|---|
| 3,961,496 A * | 6/1976 | Ku | ................................ | 62/459 |
| 4,662,183 A * | 5/1987 | Keller | ............................. | 62/138 |
| 6,571,568 B1 * | 6/2003 | Link | ............................. | 62/244 |
| 6,571,574 B1 * | 6/2003 | Blackstone | .................... | 62/420 |

* cited by examiner

*Primary Examiner* — Melvin Jones
(74) *Attorney, Agent, or Firm* — Frank Svetlik

(57) ABSTRACT

A cooling, heat exchanging, system effectively heats or cools the air within an enclosed space. The system operates for an extended time period without requiring the use of a generator or utility power.

12 Claims, 2 Drawing Sheets

ICED AIR COOLER

This application claims the benefit of U.S. Provisional Patent Application No. 60/899,359, filed Feb. 5, 1007.

FIELD OF THE INVENTION

The present invention relates generally to the field of environmental heating and cooling systems and, more particularly, to a system to heat or cool an enclosed space without exterior power or air communication to the volume outside the enclosed space.

BACKGROUND OF THE INVENTION

Many applications require the heating or cooling of an enclosed space for extended periods without breaching the enclosure. For example, a surveillance vehicle may be parked within sight of a surveillance target with the vehicle fully enclosed and any opening of the vehicle would jeopardize the secrecy of the surveillance operations. In these and other applications, the conditioning and cooling of air in confined spaces such as cars and truck cabs and off road machinery cabs has evolved from evaporative coolers to mechanized refrigeration and furnace units. Virtually all of these prior units have required some form of an external power source, such as for example a power take off from the engine operating the vehicle or machine. In the example of the surveillance operation described above, the operation of the engine of the surveillance vehicle would also jeopardize the secrecy of the operation.

Efforts to make the units portable, while emphasizing the need to stabilize the heat exchange medium to avoid sloshing into a servo-mechanical apparatus moving the air, such as that shown and described in Brock, U.S. Pat. No. 5,168,722; have not addressed the problem of running quietly and without exterior detection for a period of many hours without drawing power from the engines of the vehicles in which they are situated. The need to transfer the cooling apparatus from enclosed mobile unit to another in which the user is expected to remain without exiting or being observed for hours at a time requires that the unit fit into a limited space. As the size of the space to be cooled increases, the cooling capacity and efficiency of the cooling unit without corresponding increases in size gains greater importance. Furthermore, such portable units should preferably operate on battery power at low current.

Other units known in the art, while described as portable, are in fact tethered to an exterior source of water or utility power or both. The device disclosed in the Caron, U.S. Pat. No. 5,606,865; as with many such devices claiming portability, must have a continuing source of cool water from a tap and is not useful in a mobile installation or circumstances.

Thus, there remains a need for a system to heat or cool an enclosed space without the need for drawing air or electrical power from out side the enclosed space. The system and method described herein are directed to fulfilling this need in the art.

SUMMARY OF THE INVENTION

The cooling, heat exchanging device described herein for heating or cooling an enclosed space comprises a thermally insulated chamber having a top, a bottom and side walls into which a separating device permeable to air is inserted creating a lower section of the thermally insulated chamber below the separating device and an upper section of the thermally insulated chamber above the separating device. The separating device can be covered with finned heat sinks which provide a large surface area for heat transfer for air passing through the separating device. The separating device is elevated above the lower surface of the thermally insulated chamber by a plurality of legs fixed to the surface of the separating device in the lower section of the thermally insulated chamber.

The separating device is covered by ice cubes or a block of ice at times in which the heat exchanging device is to be operated as a cooling unit and by heated gel packs or other warm objects when the unit is to be operated as a heating unit. Care should be exercised in loading the cooling or heating medium onto the surface of the separating device to avoid damage to the heat exchanging fins on the upper surface of the separating device. The thermally insulated chamber has a first opening in one of the side walls through which ambient air from within the enclosed space is drawn into the device. A hose leads from the first opening in the upper section of the thermally insulated chamber to a pipe leading downward through the separating device from the upper section of the thermally insulated chamber to the lower section of the thermally insulated chamber. The air the passes upward through the separating device from the lower section of the thermally insulated chamber to the upper section of the thermally insulated chamber coming into contact with the finned portions of the separating device which have been cooled or heated by the medium. The air also passes over the cooling medium or heating medium in the upper section of the thermally insulated chamber.

A U-shaped exhaust pipe for the exhaust of heated or cooled air out of the thermally insulated chamber includes a plurality of ridges to help dehumidify the air, if necessary. The U-shaped exhaust pipe is suspended in the upper section of the thermally insulated chamber by being fixed to a pipe nipple through a second opening in a second wall of the upper section of the thermally insulated chamber. The open end of the U-shaped exhaust pipe is located near the upper surface of the thermally insulated chamber. The U-shaped exhaust pipe has a drain hole in the bottom to discharge condensation formed in the U-shaped exhaust pipe. The liquids from the dehumidification process drain through the drain hole in the U-shaped exhaust pipe and through the separation device into the lower section of the thermally insulated chamber. Water from melting of the ice when used as a cooler also drains through the separation device into the lower section of the thermally insulated chamber.

In a preferred embodiment a fan is mounted within the thermally insulated chamber. The fan can be located in the pipe between the first opening in the upper section of the thermally insulated chamber and the pipe leading through the separation device to the lower section of the thermally insulated chamber. The fan can also be located between the U-shaped exhaust pipe and the pipe nipple through the second opening in the upper section of the thermally insulated chamber. The fan draws ambient air from the room or cabin or other enclosed space to be cooled or heated and forces the ambient air through the iced air cooler. In this embodiment, a pump may be provided to discharge accumulated condensation from the lower section of the thermally insulated chamber into a storage reservoir for later disposal or reuse. In another preferred embodiment, the fan may be installed outside the thermally insulated chamber.

Accumulated water and liquids can be drained with or without the use of a pump whether located within the thermally insulated chamber or exterior to the thermally insulated chamber. The reservoir for containing and storing the accumulated liquids such as a five gallon can must be of sufficient volume to retain the bulk of the ice originally used to charge the iced air cooler to avoid having to drain the water to a point outside the enclosed space in which the iced air cooler is being used. The dumping of excess water could alert others to the presence of persons within the vehicle or closed space which would be undesirable in the event that discreet surveillance activities sought to avoid detection of their presence.

These and other features and advantages of the heating or cooling system described herein will be readily apparent to those of skill in the art from a review of the following detailed description along with the accompanying drawings.

DETAILED DESCRIPTION OF A PREFERRED EMBODIMENT

Figure 1:
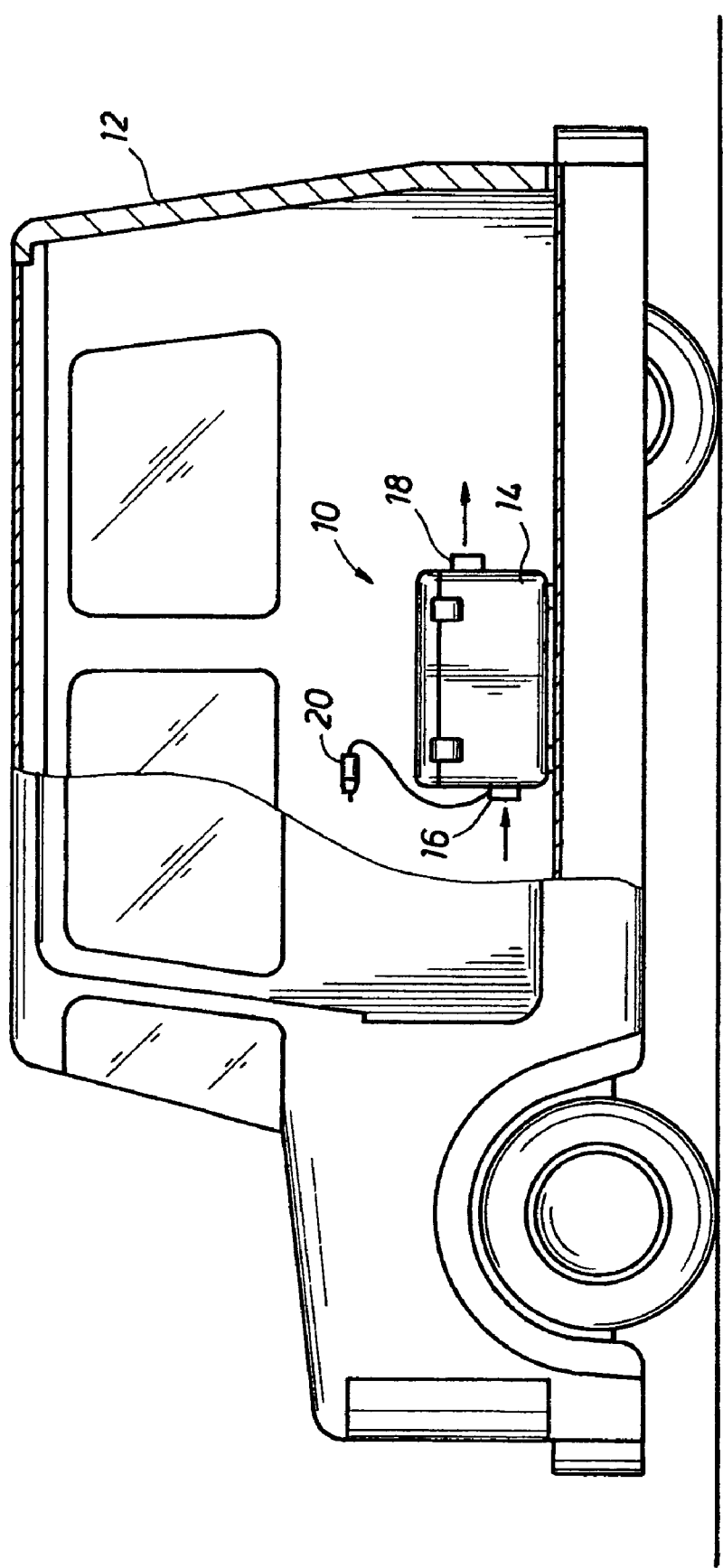
FIG. 1 side view in partial section of a vehicle in which the air cooler is installed.

FIG. 1 illustrates an application of the iced air cooler 10 described below in greater detail. In FIG. 1, the iced air cooler 10 is removably installed within a vehicle 12. The vehicle 12 is illustrated as a powered vehicle, such as a surveillance van, although the iced air cooler may be installed within a trailer or other vehicle that is enclosed so that a variation of the interior temperature of the vehicle 12 is desired. Those of skill in the art will also appreciate that the term "iced air cooler" is used to describe the device, but it is equally applicable to a portable, self-container heating device.

The iced air cooler 10 includes an thermally insulated chamber 14 with an air inlet 16 and an air outlet 18. A power cord 20 is shown schematically in FIG. 1 to illustrate that electrical power is called for, although power may be incorporated within or as part of the thermally insulated chamber 14, if desired. The power cord may draw power from the battery of the vehicle 12, or a separate DC power supply may be included as a portion of the iced air cooler structure. Also, the iced air cooler 10 is depicted as oriented fore-and-aft within the vehicle 12, but the body may preferably be arranged side to side within the vehicle.

Figure 2:
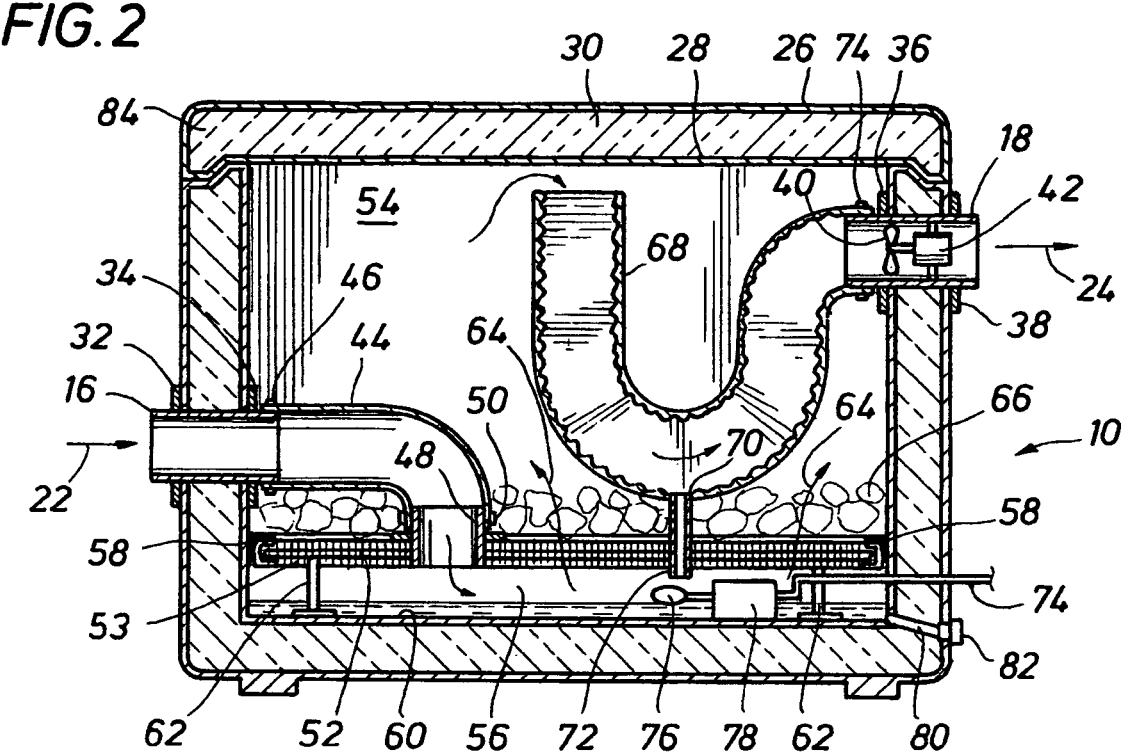
FIG. 2 is a side section view of the air cooler.
Figure 3:
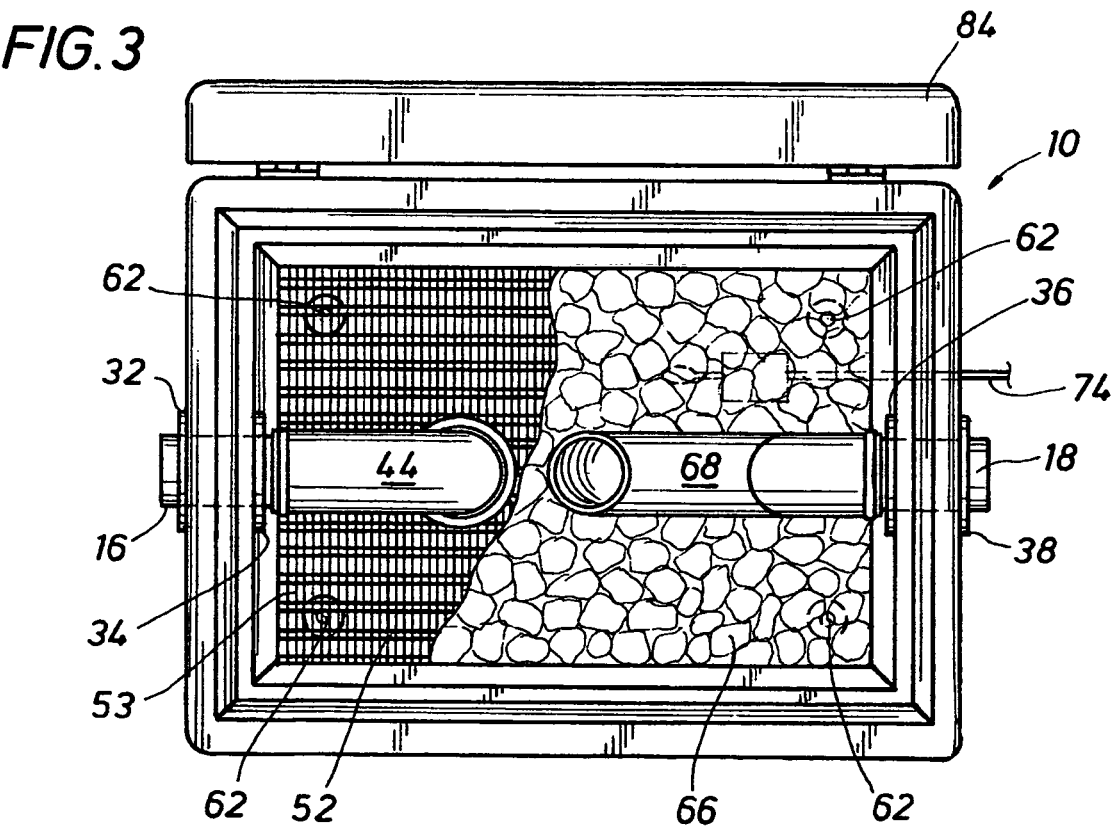
FIG. 3 is a top view of the cooler in partial section.

FIGS. 2 and 3 depict the preferred structure of the iced air cooler 10. As previously described, the iced air cooler 10 includes an air inlet 16 and an air outlet 18. Air is drawn into the thermally insulated chamber 10 as indicated by an arrow 22 and exits the thermally insulated chamber as indicated by an arrow 24. The thermally insulated chamber preferably comprises a relatively hard outer shell 26 and a relatively hard inner shell 28, separated by an insulation layer 30. The outer shell 26 and the inner shell 28 are preferably formed of a durable polyurethane plastic, although a rust proof metal such as aluminum or other metal may be used. Plastic is preferred due to its corrosion resistance and lighter weight, since the iced air cooler 10 is preferably portable and can be easily moved from one vehicle 12 to another.

In air inlet 16 is preferably formed of a short length of plastic pipe and sealed to the thermally insulated chamber 10 with an outer gasket 32 and an inner gasket 34. In a similar fashion, the air outlet 18 is preferably formed of a short length of plastic pipe and sealed with an inner gasket 36 and an outer gasket 38. A fan 40 is shown mounted within the air outlet 18, although the fan may preferably be mounted within or leading into the air inlet. The fan 40 is powered by a motor 42 which is powered from the power cord 20 (FIG. 1).

The air inlet 16 is in fluid communication with an interior supply conduit 44, which is preferably sealed at the junction with the air inlet 16 with a hose clamp 46. Together, the air inlet 16 and the interior supply conduit define an intake air conducting conduit. The interior supply conduit 44 joins to a down conduit 48 with a hose clamp 50. The down conduit 48 penetrates an air-permeable separation device 52, described in greater detail below. The separation device 52 is oriented horizontally within the thermally insulated chamber 10 to thereby define an upper section of the thermally insulated chamber 54 and a lower section of the thermally insulated chamber 56. Thus, air from the outside of the thermally insulated chamber 10 is blown or drawn into the thermally insulated chamber 10 within the lower section of the thermally insulated chamber 56. The separation device 52 is preferably sealed along its edges with a seal 58. The separation device is positioned above a bottom surface 60 of the inner shell 28 with a set of legs 62, preferably one such leg at each corner of the rectangular air-permeable separation device for a total of four such legs.

The separation device is preferably in the form of a radiator with a large number of fins 53 extending therefrom. The fins provide a very large surface area for air to blow across as the air is forced from the lower section of the thermally insulated chamber 56 to the upper section of the thermally insulated chamber 54, through penetrations in the separation device, as shown by arrows 64. The separation device supports a quantity of ice 66 to cool the air which travels through the separation device. The cooled air and picks up moisture as it travels through the ice.

The cooled air next moves into a U-shaped an outlet air conducting conduit 68. The U-shaped an outlet air conducting conduit 68 is preferably corrugated so that at least some of the moisture from the cooled air condenses onto the interior surface of the U-shaped exhaust hose 68 and settles into a low point 70 of the U-shaped exhaust hose 68. A drain 72 is provided to drain this condensation from the low point 70 into the lower section of the thermally insulated chamber 56. From the low point, the cooled and at least partially dehumidified air travels to the air outlet 18. The exhaust hose 68 is preferably joined to the air outlet 18 with a hose clamp 74. Together the exhaust hose 68 and the air outlet 18 define an outlet air conducting conduit, which includes a de-humidifier in the form of corrugated walls as shown in FIG. 2.

As the ice begins to melt, and as the drain 72 carries condensation into the lower section of the thermally insulated chamber, the lower section of the thermally insulated chamber will begin to fill up with water. A drain line 74 may be provided to carry away this condensation. A float level 76 senses the level of the water in the lower section of the thermally insulated chamber, and at its high level set point energizes a pump 78, which pumps down the water level to its low level set point, at which time the motor is turned off. Alternatively, a gravity drain line 80 may be provided, which may be capped off with a cap 82 or coupled to drain line to a capture reservoir (not shown).

FIG. 3 illustrates the iced air cooler with a cover 84 in an open position. The cover 84 may be opened for access to the upper section of the thermally insulated chamber to add more ice, for example. Those of skill in the art will now recognize that, instead of the ice, one or more heated gel packs may be placed on the top surface of the separation device, so long as adequate cross section area for air flow remains for air to flow upward through the separation device to be heated. This is particularly useful in cold climates where to run the vehicle to keep the inhabitants warm would be immediately visible from outside the vehicle. Whether the device described herein is used as a cooling apparatus of a heating apparatus, the medium for modifying the temperature of the enclosed space is referred to as an air temperature modifier.

From the foregoing it will be seen that this invention is one well adapted to attain all of the ends and objects hereinabove set forth, together with other advantages which are obvious and which are inherent to the apparatus and structure. It will be understood that certain features and subcombinations are of utility and may be employed without reference to other features and subcombinations. This is contemplated by and is within the scope of the claims. Because many possible embodiments may be made of the invention without departing from the scope thereof, it is to be understood that all matter herein set forth or shown in the accompanying drawings is to be interpreted as illustrative and not in a limiting sense.

I claim:

1. A portable system for altering the ambient temperature of air within an enclosed space, the system comprising:
   a. a thermally insulated chamber having side walls, a top, and a bottom;
   b. an air permeable separation device supported above the bottom of the thermally insulated chamber, defining an upper section of the thermally insulated chamber and a lower section of the thermally insulated chamber within the thermally insulated chamber, wherein the air permeable separation device comprises a radiator defining a plurality of radiator fins;
   c. an intake air conducting conduit through a first of the side walls, through the separation device to the lower section;
   d. an outlet air conducting conduit with an upwardly depending opening to receive air from the upper section, the outlet air conducting conduit penetrating a second of the side walls;
   e. a fan to force air through the intake air conducting conduit and the outlet air conducting conduit; and
   f. an air temperature modifier within the thermally insulated chamber.

2. The system of claim 1, wherein the air temperature modifier comprises ice.

3. The system of claim 1, wherein the air temperature modifier comprises a heated gel pack.

4. The system of claim 1, further comprising a plurality of legs supporting the air permeable separation device above the bottom of the thermally insulated chamber.

5. The system of claim 1, wherein the outlet air conducting conduit is U-shaped.

6. The system of claim 1, wherein the fan is mounted with the intake air conducting conduit.

7. The system of claim 1, wherein the top of the thermally insulated chamber is hingedly mounted to one of the side walls.

8. The system of claim 1, wherein the outlet air conducting conduit includes a de-humidifier in the form of corrugated walls.

9. The system of claim 1, further comprising a drain line from the outlet air conducting conduit to the lower section of the thermally insulated chamber.

10. The system of claim 1, further comprising a drain from the lower section of the thermally insulated chamber.

11. The system of claim 10, further comprising:
    a. a pump positioned to pump water from the lower section of the thermally insulated chamber to the drain; and
    b. a water level detector to alternately activate and deactivate the pump.

12. A portable system for altering the ambient temperature of air within an enclosed space, the system comprising:
    a. a thermally insulated chamber having a pair of opposing side walls, a front wall, a back wall, a top, and a bottom, wherein the top is hingedly mounted to the back wall;
    b. an air permeable separation device supported above the bottom of the thermally insulated chamber, defining an upper section of the thermally insulated chamber and a lower section of the thermally insulated chamber within the thermally insulated chamber, wherein the air permeable separation device comprises a radiator defining a plurality of fins, the separation device defining an opening;
    c. an intake air conducting conduit through a first of the side walls, through the opening in the separation device to the lower section;
    d. a U-shaped outlet air conducting conduit with an upwardly depending opening to receive air from the upper section, the outlet air conducting conduit penetrating a second of the side walls, the outlet air conducting conduit defining a low point;
    e. a fan mounted in the intake air conducting conduit to force air through the intake air conducting conduit and the outlet air conducting conduit;
    f. a drain from the low point in the outlet air conducting conduit to the lower section of the thermally insulated chamber;
    g. an air temperature modifier within the thermally insulated chamber; and
    h. a drain from the lower section of the thermally insulated chamber through one of the side walls.

* * * * *